US010728469B2

(12) United States Patent
Lopez et al.

(10) Patent No.: US 10,728,469 B2
(45) Date of Patent: Jul. 28, 2020

(54) ACTIVE HYPERSPECTRAL IMAGER

(71) Applicant: DRS Network & Imaging Systems, LLC, Melbourne, FL (US)

(72) Inventors: Marco A. Lopez, Villa Park, CA (US); Eden Y. C. Mei, Yorba Linda, CA (US); Eric Anderson, Yorba Linda, CA (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 170 days.

(21) Appl. No.: 15/954,373

(22) Filed: Apr. 16, 2018

(65) Prior Publication Data

US 2018/0309941 A1 Oct. 25, 2018

Related U.S. Application Data

(60) Provisional application No. 62/487,366, filed on Apr. 19, 2017.

(51) Int. Cl.
*H04N 5/33* (2006.01)
*G01J 3/28* (2006.01)
*G01J 3/45* (2006.01)
*G06T 5/10* (2006.01)
*G06T 5/50* (2006.01)
(Continued)

(52) U.S. Cl.
CPC ............... *H04N 5/332* (2013.01); *G01J 3/10* (2013.01); *G01J 3/2823* (2013.01); *G01J 3/45* (2013.01); *G01N 21/3504* (2013.01); *G06T 5/10* (2013.01); *G06T 5/50* (2013.01); *H04N 5/23229* (2013.01); *H04N 5/349* (2013.01); *H04N 9/045* (2013.01); *G01J 2003/2826* (2013.01); *G01N 2021/3595* (2013.01); *G02B 27/10* (2013.01)

(58) Field of Classification Search
CPC .... G01J 2003/2826; G01J 3/10; G01J 3/2823; G01J 3/45; G01N 2021/3595; G01N 21/3504; G02B 27/10; G06T 5/10; G06T 5/50; H04N 5/23229; H04N 5/332; H04N 5/349; H04N 9/045
USPC ........................................................ 348/164
See application file for complete search history.

(56) References Cited

U.S. PATENT DOCUMENTS 6,975,113 B1 * 12/2005 Gurr ................ G01R 33/56375
324/307
2001/0045513 A1 11/2001 Kourogi et al.
(Continued)

OTHER PUBLICATIONS

Wetzstein et al. "On Plenoptic Multiplexing and Reconstruction", Jun. 10, 2015.*

(Continued)

*Primary Examiner* — James T Boylan
(74) *Attorney, Agent, or Firm* — Kilpatrick Townsend & Stockton LLP

(57) ABSTRACT

Systems and methods are disclosed for generating hyperspectral images, which may correspond to a three dimensional image in which two dimensions correspond to a spatial field of view and a third dimension corresponds to a frequency domain absorption spectrum. Disclosed systems and methods include those employing dual optical frequency comb Fourier transform spectroscopy and computational imaging for generation of hyperspectral images. Such a combination advantageously allows for imaging systems to exhibit low size, weight, and power, enabling small or handheld sized imaging devices.

21 Claims, 8 Drawing Sheets

(51) Int. Cl.
*H04N 5/232* (2006.01)
*G01N 21/3504* (2014.01)
*G01J 3/10* (2006.01)
*H04N 9/04* (2006.01)
*H04N 5/349* (2011.01)
*G02B 27/10* (2006.01)
*G01N 21/35* (2014.01)

(56) References Cited

U.S. PATENT DOCUMENTS

| | | |
|---|---|---|
| 2007/0182966 A1 | 8/2007 | Sanders et al. |
| 2010/0225924 A1 | 9/2010 | Kuramoto |
| 2013/0063728 A1 | 3/2013 | Kuramoto |
| 2013/0100406 A1* | 4/2013 | Buckland ............... A61B 3/102 |
| | | 351/206 |
| 2015/0062586 A1* | 3/2015 | Zhu ......................... G01J 3/45 |
| | | 356/453 |

OTHER PUBLICATIONS

Hypersepctral Imaging, Section Hyperspectral and Multispectral Imaging in Dermatology by Vasefi et al. on p. 12 (which is cut out due to ads), the website below for convenience, Date: 2016 https://www.sciencedirect.com/topics/rnedicine-and-dentistry/hyperspectral-imaging.*
PCT/US2018/27813, "International Search Report and Written Opinion", dated Jun. 29, 2018, 11 pages.
Schliesser et al., "Mid-infrared frequency combs," Nature Photonics, vol. 6, Jun. 28, 2012, pp. 440-449.

* cited by examiner

ACTIVE HYPERSPECTRAL IMAGER

CROSS-REFERENCE TO RELATED APPLICATIONS

This application claims the benefit of and priority to U.S. Provisional Application 62/487,366, filed on Apr. 19, 2017, which is hereby incorporated by reference in its entirety.

BACKGROUND

A variety of different imaging techniques exist for generating digital images.

Commonly, a multi-pixel sensor is used to capture an image of a scene, and different sensing technologies may be employed, such as charge-coupled device (CCD) pixel arrays or complementary metal-oxide-semiconductor (CMOS) pixel arrays. To obtain color images, filtering or dispersion may be used to direct different wavelength regimes to individual pixel sensors. Multiple color pixel sensors may also be used. While these techniques are useful in the visible spectrum, where three separate colors (e.g., red, green, blue) may be used to generate a "full color" image, when detailed information of different wavelengths are explicitly desired, the imaging systems may become much more complex. As an example, some imaging systems of this nature may incorporate frequency scanning components in addition to multiple pixel sensor arrays.

SUMMARY

The present invention relates generally to systems and methods for generating digital images over a range of electromagnetic frequencies. More particularly, embodiments of the present invention provide systems and for generating hyperspectral images, such as by way of a low size, weight, and power (SWAP) device, which may not use or require frequency filtering components, frequency scanning components, or dispersive elements.

In embodiments, systems and methods described herein employ frequency combs as a broad band electromagnetic radiation source for illuminating a scene across a range of frequencies. The illuminated electromagnetic radiation may interact with objects in the scene through the usual processes of reflection, scattering, and absorption, and electromagnetic radiation from the scene is captured for detection. The detected electromagnetic radiation is used to reconstruct digital images of the scene for different frequencies.

In an aspect, imaging devices are disclosed. For example, in some embodiments, an imaging device comprises a first frequency comb source for generating a first frequency comb at a first repetition rate; a second frequency comb source for generating a second frequency comb at a second repetition rate that is offset from the first repetition rate; a first beam combiner in optical communication with the first frequency comb source and the second frequency comb source, the first beam combiner for combining the first frequency comb and the second frequency comb to generate a dual frequency comb; a first beam splitter in optical communication with the first beam combiner, the first beam splitter for splitting the dual frequency comb to generate an interrogation beam and a reference beam; a spatial encoder in optical communication with the first beam splitter, the spatial encoder for spatially encoding the reference beam using a set of reference fields to generate an encoded reference beam; a reflective telescope in optical communication with the first beam splitter, the reflective telescope for illuminating a target with the interrogation beam; a collection optic positioned to collect reflected light generated by interaction of the interrogation beam with the target; a second beam combiner in optical communication with the spatial encoder and the collection optic, the second beam combiner for combining the reflected light with the encoded reference beam to generate a combined beam; and a detector in optical communication with the second beam combiner, the detector for detecting the combined beam and producing a set of interferograms. It will be appreciated that imaging devices of this aspect are useful, for example, for performing dual frequency comb Fourier transform spectroscopy.

Imaging devices of this aspect may further comprise a processor and a non-transitory computer readable storage medium in data communication with the processor and including processor executable instructions, which may configure the processor to perform specific operations, instructions, or methods. For example, an imaging device may further comprise a processor configured to generate a hyperspectral digital image of the target using the set of interferograms and the set of reference fields.

The processor may be useful for performing aspects of Fourier transform spectroscopy and/or digital image manipulation and/or reconstruction. For example, generating the hyperspectral digital image of the target optionally includes computing, such as by using the processor, inverse Fourier transforms of the set of interferograms, with each interferogram spatially weighted by a corresponding reference field. Optionally, generating the hyperspectral digital image of the target includes performing, such as by using the processor, a coded aperture imaging reconstruction algorithm using the set of interferograms and the set of reference fields, a computational ghost imaging reconstruction algorithm using the set of interferograms and the set of reference fields, a Hadamard transform imaging reconstruction algorithm using the set of interferograms and the set of reference fields, a coherent imaging by phase retrieval with structured illumination imaging reconstruction algorithm using the set of interferograms and the set of reference fields, or a Fourier Transform homodyne imaging reconstruction algorithm using the set of interferograms and the set of reference fields. It will be appreciated that the hyperspectral digital image may correspond to a 3-dimensional representation of the target including a first spatial dimension, a second spatial dimension, and a third dimension corresponding to a frequency domain absorption spectrum.

A variety of frequency comb sources are useful with the imaging devices and methods disclosed herein. For example, the first frequency comb source, the second frequency comb source, or both, may each independently comprise a NIR femtosecond laser source, a crystalline micro-resonator, a silicon optical micro-resonator, an erbium-doped fiber laser, a photonic crystal fiber, or any combination of these. Optionally, the first repetition rate and the second repetition rate may be offset by a factor between $10^{-5}$ and $10^{-7}$.

A variety of spatial encoders are useful with the imaging devices and methods disclosed herein. For example, the spatial encoder may optionally comprise a digital micromirror device, a spatial light modulator, a liquid crystal on silicon device, a liquid crystal array, a deformable mirror, or any combination of these. It will be appreciated that the spatial encoder may be useful for modifying a spatial intensity distribution of the reference beam. For some embodiments, a spatial encoder may be used for modifying a spatial intensity distribution of the interrogation beam.

A variety of detectors are useful with the imaging devices and methods disclosed herein. For example, in one embodiment, the detector comprises a single pixel detector. Optionally, the detector comprises a multiple pixel detector. Optionally, outputs from each of the multiple pixels may be summed to provide an overall output, which may allow a multiple pixel detector to operate equivalent to a single pixel detector. Optionally, the detector comprises one or more of a broadband infrared detector, a short-wavelength infrared detector, a mid-wavelength infrared detector, and a long-wavelength infrared detector. Optionally, the detector comprises a thermoelectrically cooled detector.

A variety of optical elements are useful with the imaging devices and methods disclosed herein. Without limitation, the imaging devices may include fewer or additional optical elements as illustrated in any of the accompanying figures, for example. Optionally, the first beam combiner, the second beam combiner, or both comprise beam splitters. Optionally, the collection optic comprises the reflective telescope. Optionally, an imaging device further comprises one or more lenses, mirrors, beam splitters, filters, prisms, polarizers, waveguides, or any combination thereof. Additional optical elements may be positioned in optical communication with one or more of the first frequency comb source, the second frequency comb source, the first beam combiner, the first beam splitter, the spatial encoder, the reflective telescope, the collection optic, the second beam combiner, and the detector, for example.

In another aspect, methods for generating a hyperspectral image are disclosed. For example, some methods of this aspect comprise generating a first frequency comb at a first repetition rate; generating a second frequency comb at a second repetition rate that is offset from the first repetition rate; combining the first frequency comb and the second frequency comb to generate a dual frequency comb; splitting the dual frequency comb to generate an interrogation beam and a reference beam; spatially encoding the reference beam using a set of reference fields to generate an encoded reference beam; illuminating a target with the interrogation beam, wherein the interrogation beam interacts with the target to generate reflected light; collecting the reflected light; combining the reflected light with the encoded reference beam to generate a combined beam; detecting the combined beam to produce a set of interferograms; and reconstructing a hyperspectral digital image of the target using the set of interferograms and the set of reference fields. As described above, computational systems, such as a processor based system, may be useful for performing portions of the methods of this aspect. In embodiments, the hyperspectral digital image corresponds to a 3-dimensional representation of the target including a first spatial dimension, a second spatial dimension, and a third dimension corresponding to a frequency domain absorption spectrum.

Various image reconstruction techniques are useful with the methods of this aspect, which may be processor or computer performed in real-time. For example, reconstructing the hyperspectral digital image of the target may include: determining inverse Fourier transforms of the set of interferograms, with each interferogram spatially weighted by a corresponding reference field. Optionally, reconstructing the hyperspectral digital image of the target includes performing a coded aperture imaging reconstruction algorithm, a computational ghost imaging reconstruction algorithm, a Hadamard transform imaging reconstruction algorithm, a coherent imaging by phase retrieval with structured illumination imaging reconstruction algorithm, or a Fourier Transform homodyne imaging reconstruction algorithm.

It will be appreciated that methods of this aspect may be performed by any of the imaging devices described herein.

For example, in embodiments, the first frequency comb is generated by a first frequency comb source and the second frequency comb is generated by a second frequency comb source. Optionally, generating the dual frequency comb includes combining the first frequency comb and the second frequency comb using a first beam combiner. Optionally, generating the interrogation beam and the reference beam includes using a first beam splitter to split the dual frequency comb. Optionally, spatially encoding the reference beam includes using a spatial encoder. Optionally, illuminating the target includes using a reflective telescope. Optionally, collecting the reflected light includes using a collection optic. Optionally, combining the reflected light with the encoded reference beam includes using a second beam combiner. Optionally, detecting the combined beam includes using a detector.

Numerous benefits are achieved by way of the present invention over conventional techniques. For example, embodiments of the present invention provide compact or handheld systems capable of generating images over a wide range of spectral regions, such as between the UV region and the terahertz band. It will be appreciated that currently available detectors may be useful in a subset of this broad spectral range rather than over the entire range. Some systems may incorporate one or more individual detectors to achieve imaging over a wider spectral range. Additionally, different handheld or compact systems each configured to detect different subsets of the broad spectral range are contemplated. The ability to obtain images over these ranges may advantageously allow for improved gas detection, including mixed gas detection, as well as materials identification. In addition, suitably designed systems may allow for rapid hyperspectral imaging and may also facilitate long range imaging. It will be appreciated that long range imaging systems may require high output power and so eye safety considerations should be addressed. Additionally, it will be appreciated that the present systems and methods may allow for rapid hyperspectral image acquisition, such as in real-time and/or within a useful time period, such as between 0 and 5, 10, or 30 seconds. In other words, systems and methods described herein may optionally obtain a hyperspectral image within 5, 10, or 30 seconds. These and other embodiments of the invention along with many of its advantages and features are described in more detail in conjunction with the text below and attached figures.

DETAILED DESCRIPTION

Embodiments of the present invention relate to digital imaging systems and related methods for creating hyperspectral images. As described herein, a hyperspectral digital image corresponds to a two-dimensional representation of a scene, where each digital image element (pixel) includes information for a range of electromagnetic frequencies. As an example, a hyperspectral digital image may correspond to a two-dimensional digital image of a scene, but rather than including a single intensity for each pixel or element of the image as in a black and white image, or 3 different intensities for each pixel for a color image, intensity information for many different frequency regimes are included in the image. In some embodiments, a hyperspectral digital image may include intensity information for a broad range of infrared frequencies, such as frequencies between about 700 nm and about 15 µm.

In some embodiments, hyperspectral digital images may be obtained over even greater frequency ranges, depending on the spectral characteristics of the imaging source and detector used. In some embodiments a broadband source of electromagnetic radiation is used to illuminate a scene or target, such as a broadband source of laser electromagnetic radiation, and a broadband detector is used to detect electromagnetic radiation collected from the scene. Optionally, multiple broadband electromagnetic radiation sources and/or multiple broadband detectors can be used in tandem to image a scene or target to obtain a hyperspectral image or images over an expanded spectral region. In this way, obtaining hyperspectral images over a range between ultraviolet electromagnetic radiation and terahertz electromagnetic radiation, or one or more sub ranges therein, is possible. It will be appreciated that adding different broadband electromagnetic radiation sources and/or broadband detectors may increase complexity, size, weight, and power usage of a hyperspectral imaging system. As an alternative useful for maintaining low size, weight, and power (SWAP), different hyperspectral imaging system embodiments are contemplated that may be used for imaging in different spectral regions, such as ultraviolet, visible, near-infrared, midinfrared, far-infrared, etc.

Broadband electromagnetic radiation sources contemplated herein include frequency comb sources, such as optical frequency comb sources, infrared frequency comb sources, etc. Example frequency comb sources include, but are not limited to femtosecond lasers, such as near-infrared femtosecond lasers, micro-resonators, such as those made from crystalline materials like calcium and/or magnesium fluoride or silicon optical micro-resonators, erbium-doped fiber lasers, fiber lasers incorporating photonic crystal fibers, and any combination of these. It will be appreciated that for low SWAP applications, micro-resonator lasers may be particularly advantageous.

Figure 1A:
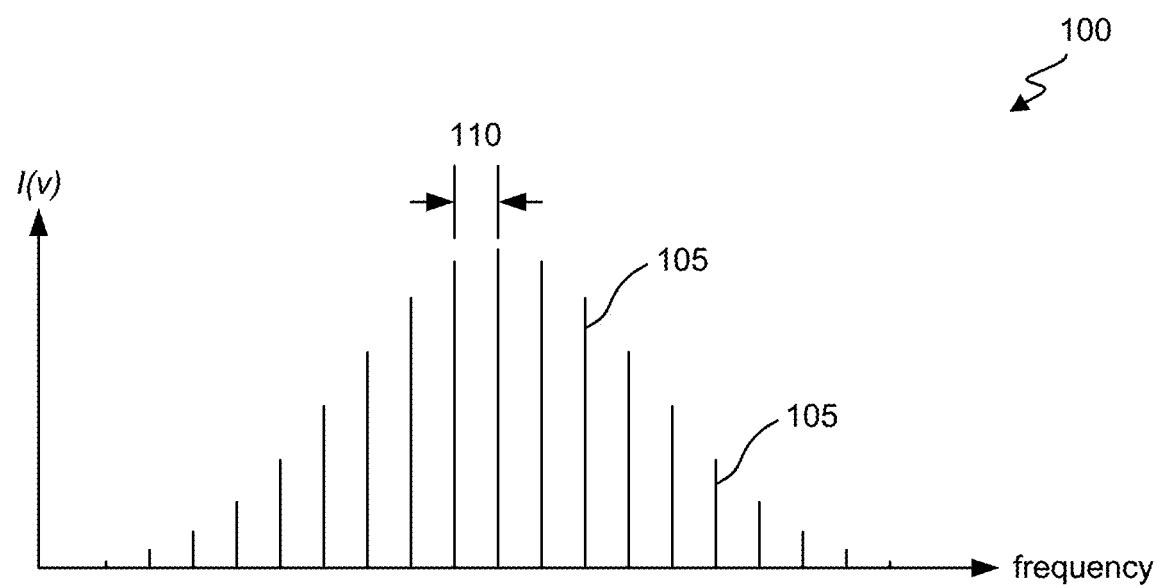
FIG. 1A provides a schematic representation of a frequency comb intensity profile in the frequency domain in accordance with some embodiments.

FIG. 1A provides a schematic representation of a frequency comb intensity profile 100 in the frequency domain. The frequency comb includes a series of discrete elements 105 each having a different frequency and spaced by an inter-element frequency spacing 110. In the frequency comb illustrated in FIG. 1, the intensity profile follows an approximately Gaussian distribution. In embodiments, other intensity distributions may be encountered, utilized, or implemented.

Figure 1B:
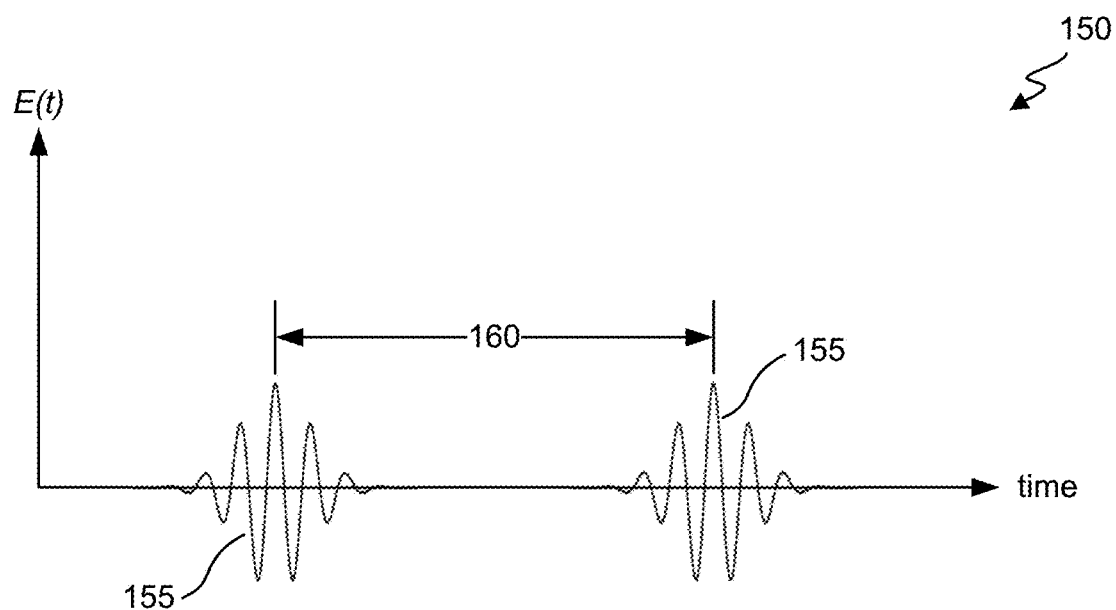
FIG. 1B provides a schematic representation of a frequency comb electric field profile in the time domain in accordance with some embodiments.

In embodiments, a frequency comb can be generated by a pulse train in a laser, such as a femtosecond laser. FIG. 1B provides a schematic representation of a pulse train electric field profile 150 in the time domain. Two individual pulses 155 are illustrated, exhibiting a repetition time 160 ($t_{rep}$) that is inversely related to the repetition frequency ($t_{rep}=1/f_{rep}$). It will be appreciated that the inter-element frequency spacing 110 may correspond or be proportional to the repetition frequency $f_{rep}$.

Accordingly, a frequency comb can be conceptually thought of as a series of pulses of electromagnetic radiation, with each pulse including all the frequencies appearing in the frequency comb, with relative intensities defined by the frequency comb intensity profile. Thus, a frequency comb may be considered a broadband electromagnetic radiation source. When used as an electromagnetic radiation source for a spectrometer, a frequency comb is useful for probing spectral features, such as absorption characteristics, of a target or sample over a wide range of frequencies at the same time. In some embodiments, many tens or hundreds of comb lines can be included in a frequency comb.

In embodiments, multiple frequency comb sources are useful for obtaining spectral characteristics of an illuminated sample or target. For example, in embodiments, two frequency combs with a slightly offset repetition frequency may be used to perform dual frequency comb Fourier transform spectroscopy. Schliesser et al., Nature Photonics 6, 440-449 (2012), which is hereby incorporated by reference, provides an overview of frequency combs and their use in spectroscopy, including dual frequency comb Fourier transform spectroscopy. Advantageously, the use of dual frequency comb Fourier transform spectroscopy permits obtaining high resolution broadband spectra of targets or samples in a short time period with no or few moving parts in the system.

Although frequency combs can be useful for obtaining spectral characteristics for a target or sample, the ability to spatially resolve different portions of the target may be dictated by the size of the sample or target illuminated by the frequency combs, and/or the detector dimensions and optical imaging elements used. Thus, in order to obtain a spatially separated image of a target, it may be desirable, for some embodiments, to spatially scan the frequency comb over the target to obtain individual spectral details for each spatial component. However, for some embodiments, spatially scanning the frequency comb may add to the complexity and size of a frequency comb spectrometer and so other techniques for spatially resolving aspects of a target are useful. In addition, the time needed to scan the target at may also be a significant limitation, so techniques employing a broad field-of-view imaging technique may also be useful to allow hyperspectral images to be obtained more quickly.

One technique for spatially resolving different portions of a target that is useful, in various embodiments, employs computational imaging techniques. In computational imaging techniques, the target may be illuminated for spectroscopic purposes and computational and reference encoding aspects in the frequency combs may be combined to spatially resolve the spectra. A variety of computational imaging techniques are useful with the systems and methods described herein, including coded aperture imaging, computational ghost imaging, Hadamard transform imaging, coherent imaging by phase retrieval with illumination pattern constraints, and homodyne imaging of transverse electromagnetic fields, for example.

In general, the computational imaging techniques described herein make use of a spatial encoder that spatially encodes a portion of a frequency comb or frequency combs. For example, the frequency combs may first be combined to generate a combined frequency comb and then a first portion of the combined frequency comb may be used to interrogate the target while a second portion of the combined is used as a reference comb. In some embodiments, the interrogation portion is spatially encoded before it interacts with the target. In some embodiments, the reference portion is spatially encoded. Electromagnetic radiation is collected from the interrogation interaction and combined with the reference portion and detected. The detected signal may then be resolved into a spatially decoded hyperspectral image.

Figure 2:
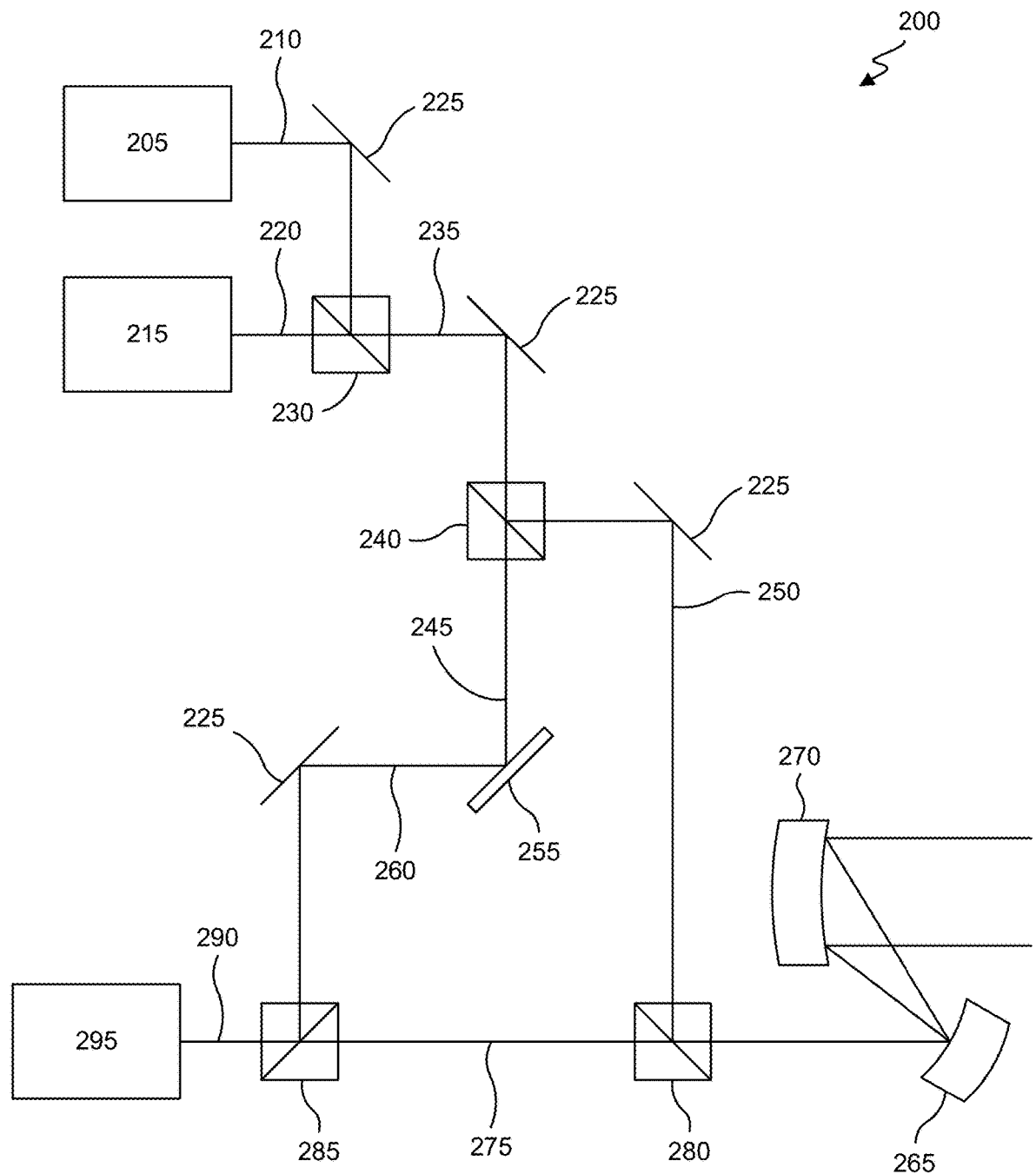
FIG. 2 provides a schematic overview of a hyperspectral imaging device in accordance with some embodiments.

FIG. 2 provides a schematic overview of a hyperspectral imaging device 200 incorporating various aspects described above. Hyperspectral imaging device 200 includes a first frequency comb source 205, which generates a first frequency comb 210 and a second frequency comb source 215, which generates a second frequency comb 220. Frequency combs 210 and 220 are combined by a beam combiner 230, and one or more folding optics 225 may be useful in directing the frequency combs 210 or 220 for their combination at beam combiner 230.

The combination of frequency combs 210 and 220 at beam combiner 230 generates a dual frequency comb 235. It will be appreciated that the repetition rates of frequency combs 210 and 220 may be offset in order for dual frequency comb Fourier transform spectroscopy to be performed using dual frequency comb 235, for example. Dual frequency comb 235 is split by beam splitter 240 into a reference beam 245 and an interrogation beam 250. Again, one or more folding optics 225 are optionally useful for directing and or orienting dual frequency comb 235, reference beam 245 and interrogation beam 250, as necessary.

In the embodiment illustrated in FIG. 2, reference beam 245 is directed to a spatial encoder 255 for spatially encoding reference beam 245. A set of reference fields may be used by spatial encoder 255 to generated an encoded reference beam 260. By spatially encoding reference beam 245, spatial resolution of the target may be achieved through computational imaging techniques, as will be described in further detail below. For some embodiments (not illustrated in FIG. 2), the interrogation beam 250 is spatially encoded by a spatial encoder (instead of or in addition to spatially encoding interrogation beam 245), to generate an encoded interrogation beam.

As illustrated in FIG. 2, interrogation beam 250 is directed to a reflective telescope 265, 270 to illuminate a target. Electromagnetic radiation 275, after interaction with the target, is collected. Optionally, reflective telescope 265, 270 is used to both illuminate the target and collect electromagnetic radiation from the target. In another embodiment (not illustrated), a first reflective telescope is used to illuminate the target, while one or more collection optics, such as a second reflective telescope, are used to collect electromagnetic radiation from the target.

In the case of reflective telescope 265, 270 used to both illuminate and collect radiation from the target, a beam splitter 280 may be optionally used to allow the paths of interrogation beam 250 and collected electromagnetic radiation 275 to be combined. For example, as illustrated, interrogation beam 250 is directed from beam splitter 280 to reflective telescope 265, 270, while collected electromagnetic radiation 275 is directed from reflective telescope 265, 270 to and through beam splitter 280.

An additional beam splitter 285 may be used to combine encoded reference beam 260 and collected electromagnetic radiation 275 into a combined beam 290 prior to detection by detector 295. A variety of detectors may be useful with the systems and methods described herein including, but not limited to, single pixel detectors, multiple pixel detectors, broadband electromagnetic radiation detectors, such as an optical electromagnetic radiation detector, a broadband infrared detector, a short-wavelength infrared detector, a mid-wavelength infrared detector, and a long-wavelength infrared detector. It will be appreciated that single pixel detectors may be useful for reducing SWAP of a hyperspectral imaging system.

It will be appreciated that additional or fewer optical elements may be included in various embodiments of a hyperspectral imaging device. For example, one or more lenses, mirrors, beam splitters, beam combiners, filters, prisms, polarizer, waveguides, and the like may be included in optical communication with other optical elements in the hyperspectral imaging device, such as a frequency comb source, a beam combiner, a spatial encoder, a reflective telescope a collection optic, a detector, etc., to direct, shape, or modify a frequency comb, dual frequency comb, reference beam, interrogation beam, collected electromagnetic radiation, combined beam, etc., as desired.

As described herein, spatially encoding the reference or interrogation beam may allow for spatial reconstruction of the target using a computational imaging technique. A variety of spatial encoders may be useful with the systems and methods described herein. For example, a spatial encoder may correspond to a digital micromirror device, a spatial light modulator, a liquid crystal on silicon device, a liquid crystal array, a deformable mirror, and the like. The spatial encoders useful with the systems and methods described herein advantageously allow a beam to be spatially encoded using a variety of different reference fields, which may be known and controlled.

It will be appreciated that additional components may be included in a hyperspectral imaging device. For example, a processor and associated memory, such as a non-transitory processor readable storage medium, may be included in a hyperspectral imaging device. Optionally, the processor may read and execute processor executable instructions from a memory unit in data communication with the processor. The processor may be in data communication with one or more of the first frequency comb source 205, the second frequency comb source 215, the spatial encoder 255 and the detector 295. For example, the processor may control timing and or tuning characteristics of first frequency comb source 205 and/or second frequency comb source 215. The processor may control the spatial encoding patterns provided by spatial encoder 255, such as by providing spatial patterns or instructions to the spatial encoder 255.

The processor may also obtain data, directly or indirectly, from detector 295, which may be a photodetector or other electromagnetic radiation detector. For example, the processor may obtain data corresponding to time dependent intensity or power signals detected from receipt of combined beam 290 by detector 295. It will be appreciated the detected signal may be used to obtain spectral characteristics of the target in the frequency domain through the application of a Fourier transform. In embodiments, detector 295 corresponds to a single element detector and, in the case where spatial encoder 255 is not present or does not spatially encode reference beam 245, the resultant spectrum corresponds to a spectral ensemble over an entirety of the field of view of the sensor over the target area. It will be appreciated, however, that spatially dependent spectral characteristics of the target can be obtained by encoding the reference beam 245 and using computational imaging techniques where the encoding patterns are correlated with the detected time-dependent intensity or power signals.

Figure 3A:
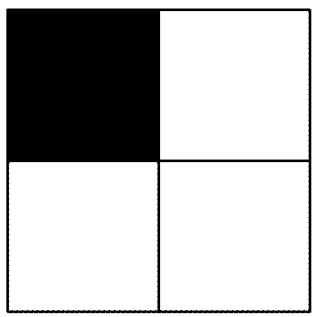
FIG. 3A provides schematic representations of 2×2 spatial encoding patterns and FIG. 3B provides schematic representations of 4×4 spatial encoding patterns.
Figure 3A:
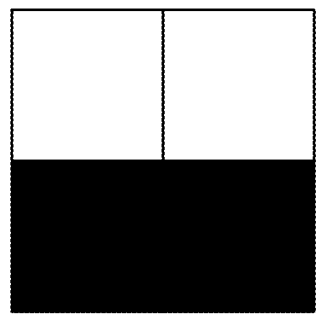
Figure 3A:
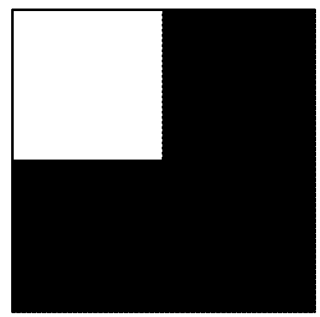
Figure 3A:
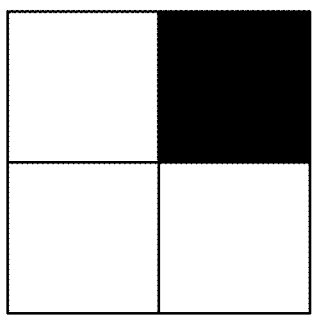
Figure 3A:
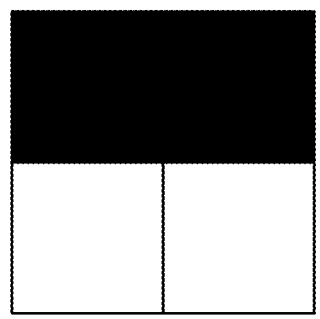
Figure 3A:
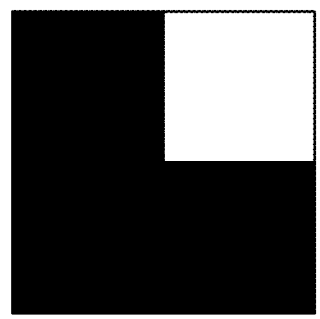
Figure 3A:
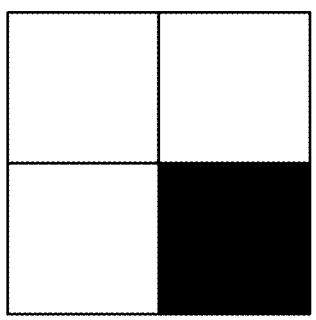
Figure 3A:
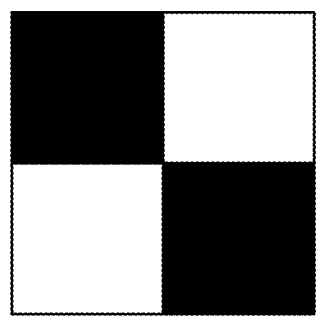
Figure 3A:
Figure 3A:
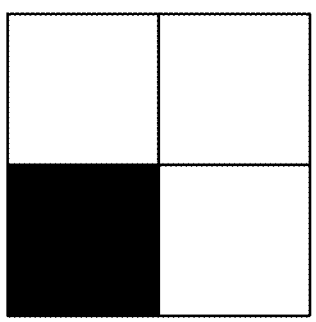
Figure 3A:
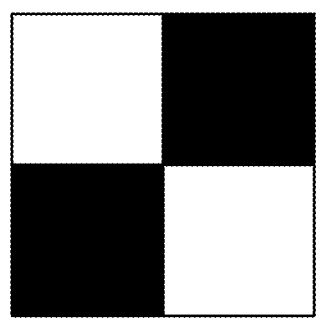
Figure 3A:
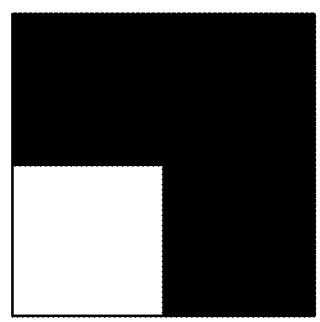
Figure 3B:
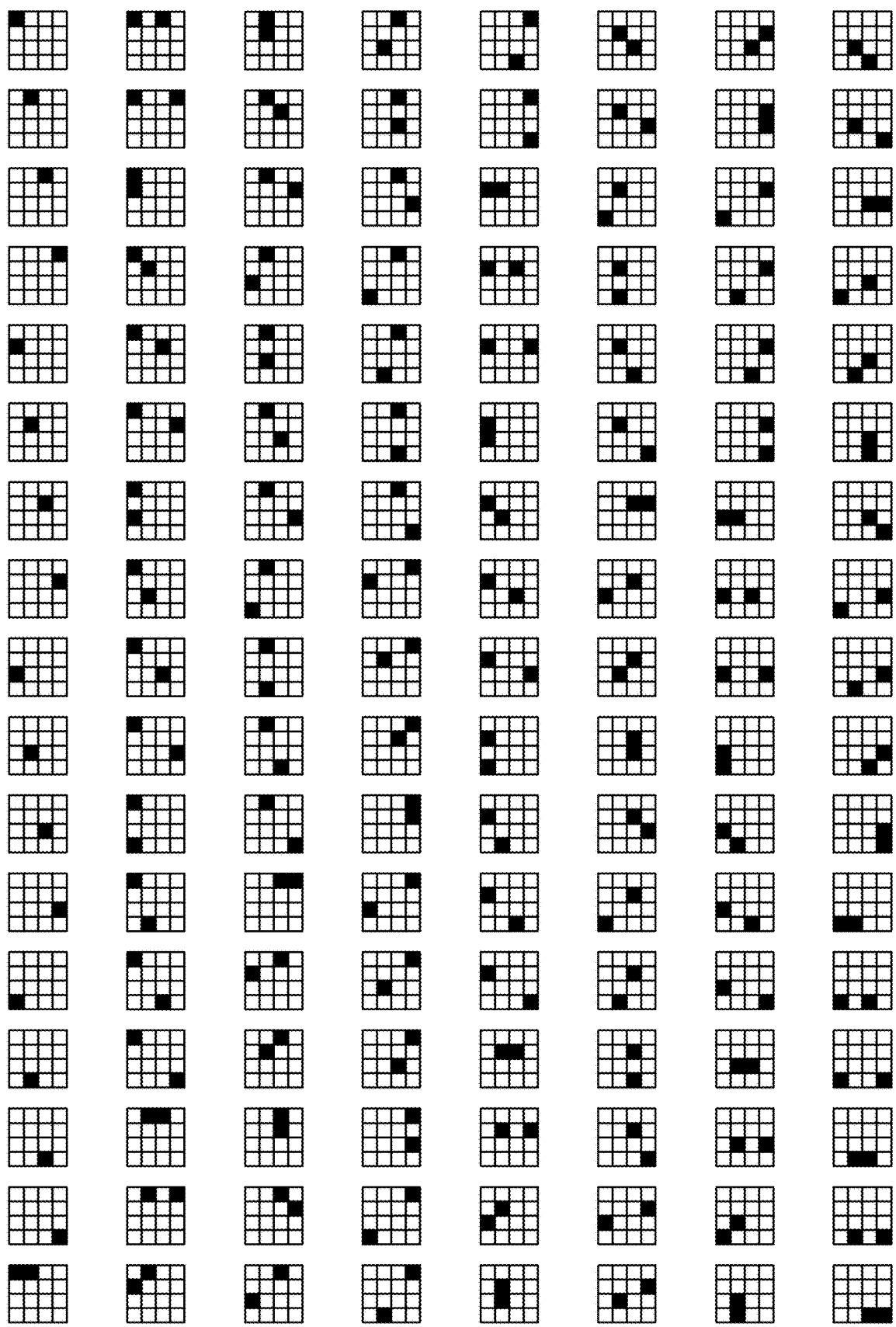

FIG. 3A and FIG. 3B depict some example reference fields (also referred to herein as encoding patterns) that may be created using a spatial encoder. As an example, the spatial encoder will be described as a digital micromirror device for ease of explanation, though other spatial encoder devices may employ similar encoding techniques and/or will be appreciated in view of the present description. FIG. 3A depicts reference fields that are split into quadrants (i.e., a 2×2 element encoding pattern) including fields where there are at least 1 quadrant turned on (white) or at least 1 quadrant turned off (black). For a digital micromirror device, this may represent a 2×2 element micromirror device in the simplest example, with white elements representing a digital micromirror element that reflects an incident beam portion into the encoded beam and the black elements representing a digital micromirror element that reflects an incident beam portion out of the encoded beam. It will be appreciated that the encoding pattern may also otherwise represent encoding by any arbitrary number of elements, i.e., an N element×N element micromirror device where the encoding occurs using N/2 element×N/2 element sized quadrants. Non-square encoding may also be used, such as where the number of horizontal elements and the number of vertical elements are different. FIG. 3B depicts reference fields that are split into 16 elements (i.e., a 4×4 element encoding pattern) including fields where there are at least one or two fields turned off. For a digital micromirror device, this may represent a 4×4 element micromirror device in the simplest example, where the encoding occurs using N/4 element×N/4 element sized fields. It will be appreciated that many different encoding patterns can be implemented using the methods and systems described herein and that the encoding patterns depicted in FIGS. 3A and 3B represent some of the simplest encoding patterns.

It will further be appreciated that certain computational imaging techniques may employ certain encoding patterns for particular advantages. Additionally, the encoding patterns employed may utilize the maximum available resolution of the spatial encoder, or utilize less than the maximum available resolution of the spatial encoder. It will also be appreciated that any type of spatial encoder used for encoding a beam may be employed in a controlled and/or predetermined fashion, such that the encoding pattern used is known and may be later used as an input in a computational imaging technique for spatially resolving components of a detected combined beam, for example.

The systems and methods described herein may be advantageously employed in generating hyperspectral images of a target. It will be appreciated that the term hyperspectral image may correspond to a spatially resolved image including a plurality of individually spatially resolved pixels, where each pixel corresponds to a portion of the target and together make up the full image of the target. Each pixel may be associated with spectral information for a number of different frequencies (or wavelengths) of electromagnetic radiation. In embodiments, the number of different frequencies (or wavelengths) of electromagnetic radiation corresponds to the number of discrete frequency elements in a frequency comb or a fraction thereof.

Figure 4A:
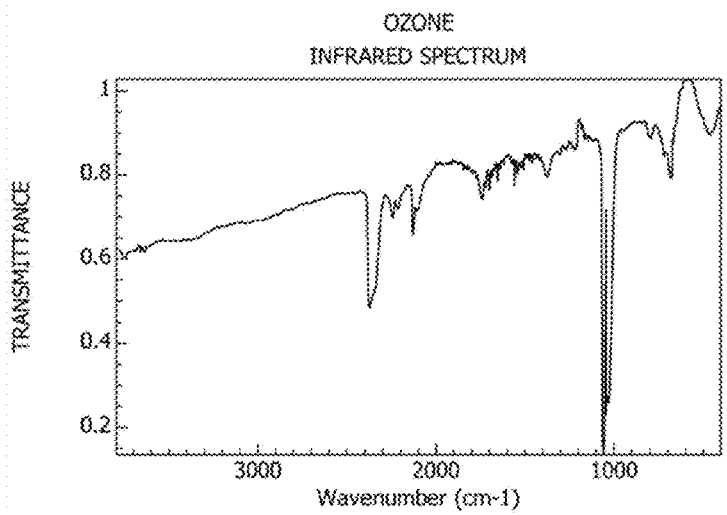
FIG. 4A, FIG. 4B, and FIG. 4C provide plots showing example infrared spectra of different compounds.
Figure 4B:
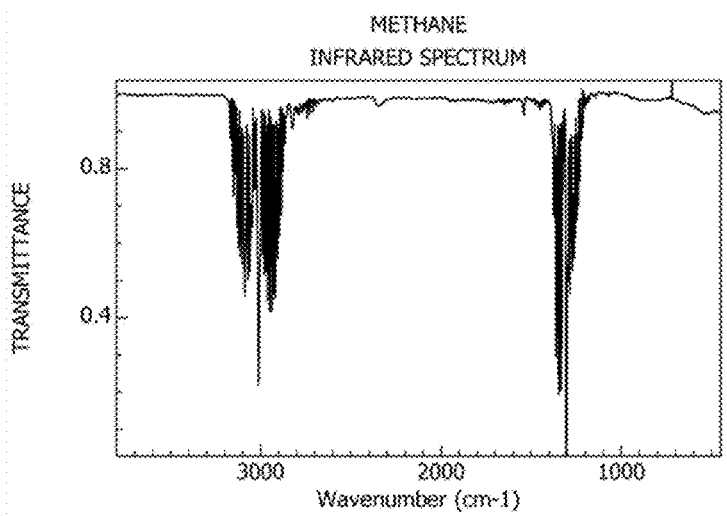
Figure 4C:
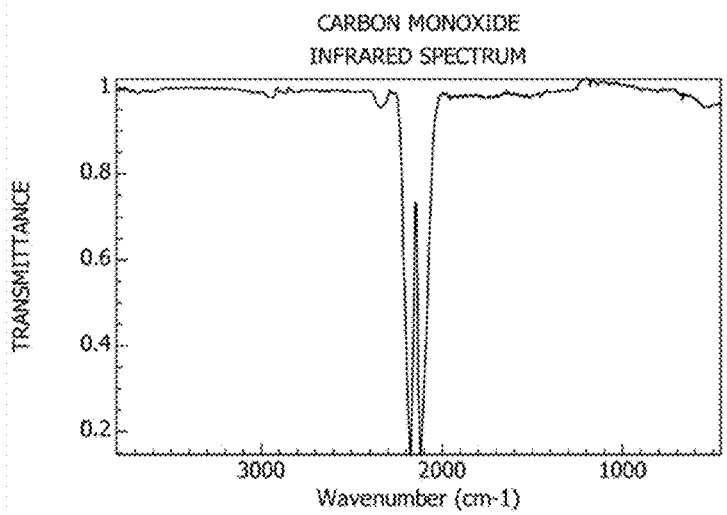

As one example, a hyperspectral image of a target may correspond to an image including infrared spectral absorption information. Infrared hyperspectral images are useful, in embodiments, as infrared spectra may be used to distinctly identify different chemical species present in the target. For example, FIG. 4A, FIG. 4B, and FIG. 4C respectively provide reference infrared spectra of three different chemical species, ozone ($O_3$), methane ($CH_4$), and carbon monoxide (CO), respectively and it will be appreciated that each of these species exhibits a distinct absorption peak from the others. For example, $O_3$ exhibits a strong absorption peak at about 1058 $cm^{-1}$ (about 9.45 μm), while $CH_4$ exhibits a strong absorption peak at about 1305 $cm^{-1}$ (about 7.66 μm), and CO exhibits strong absorption peaks at about 2120 $cm^{-1}$ (about 4.72 μm) and about 2176 $cm^{-1}$ (about 4.6 μm) and so spectral characteristics at these frequencies/wavelengths may be used to distinguish between these chemical species. It will be appreciated these chemical species are merely examples and that a multitude of other chemical species may be detected using infrared spectroscopy.

Figure 5A:
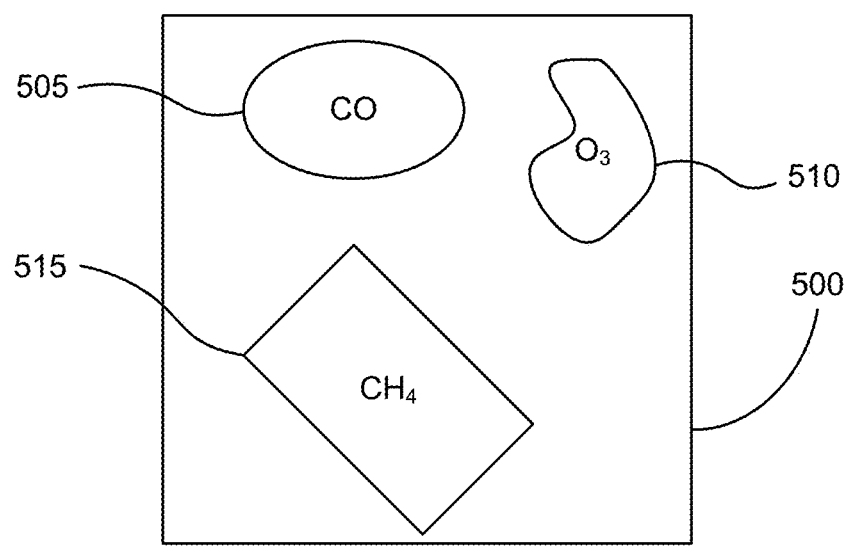
FIG. 5A provides an illustration of a reference target.
Figure 5B:
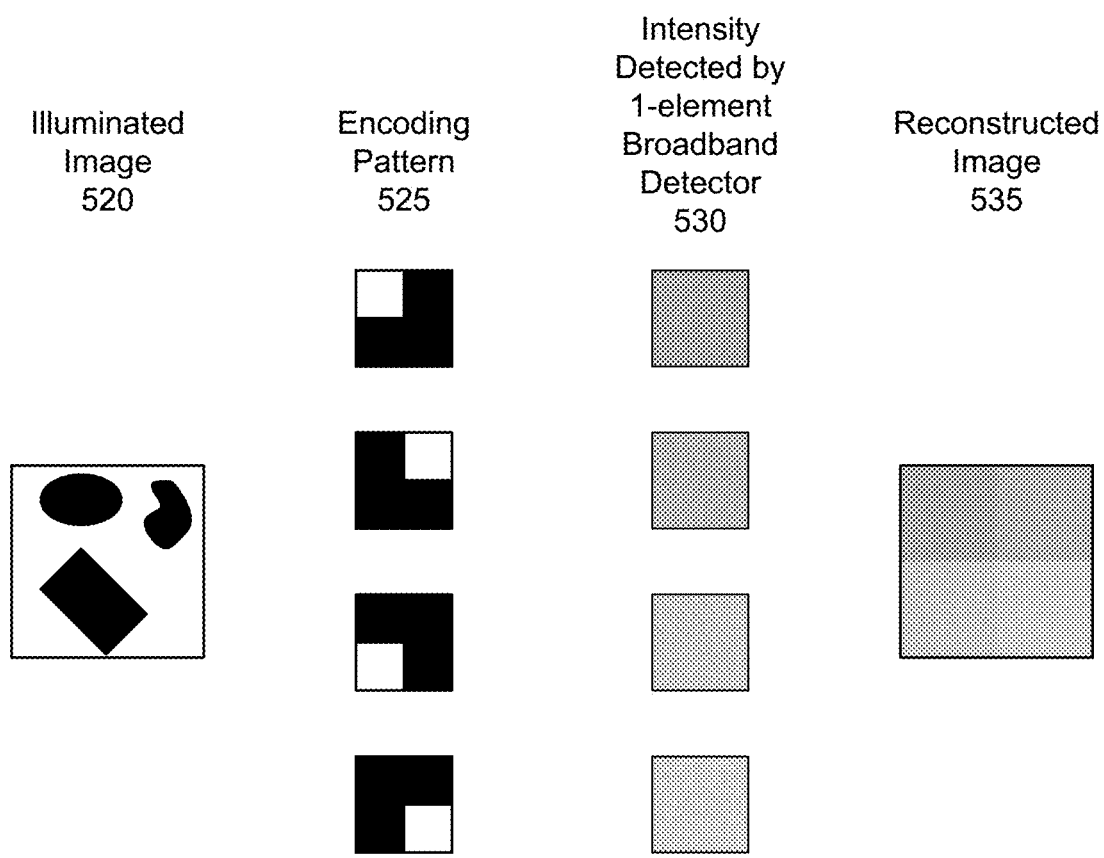
FIG. 5B provides an overview of an example image reconstruction.

FIG. 5A depicts a schematic illustration of an example target 500, which may correspond to a reference target including a first region 505 where CO is exclusively found, a second region 510 where $O_3$ is exclusively found and a third region 515 where $CH_4$ is exclusively found. FIG. 5B provides a simplified overview of an example image reconstruction using a sequence of 2×2 encoded beam patterns. In this simple example, the illuminated image 520 corresponds to the overall exposure and absorption of the target 500 by an unencoded interrogation beam. In this example, the encoding pattern 525 is used to encode the interrogation beam and the spatial encoding may be directly applied and reproduced over the full target 500. The overall intensity of the collected electromagnetic radiation by a single element broadband detector is depicted schematically as a greyscale intensity pattern 530. The different quadrants corresponding to the encoding pattern can be recombined into a reconstructed image 535 by making use of the known encoding pattern 525 used in association with the detected intensity 530 for each encoding. It will be appreciated that certain computational imaging techniques will employ spatial encoding of a reference beam rather than an interrogation beam and that this example is provided simply for ease of understanding one image reconstruction method. Other computational imaging techniques are described in detail in the below examples.

Although an overall absorption intensity over multiple spectral positions is represented in reconstructed image 535, it will be appreciated that the use of a dual frequency comb Fourier transform technique may allow for spatial separation of different frequency components of the target. In addition, use of additional and/or different encoding patterns may be useful for increasing the spatial resolution of the reconstructed image.

Figure 6:
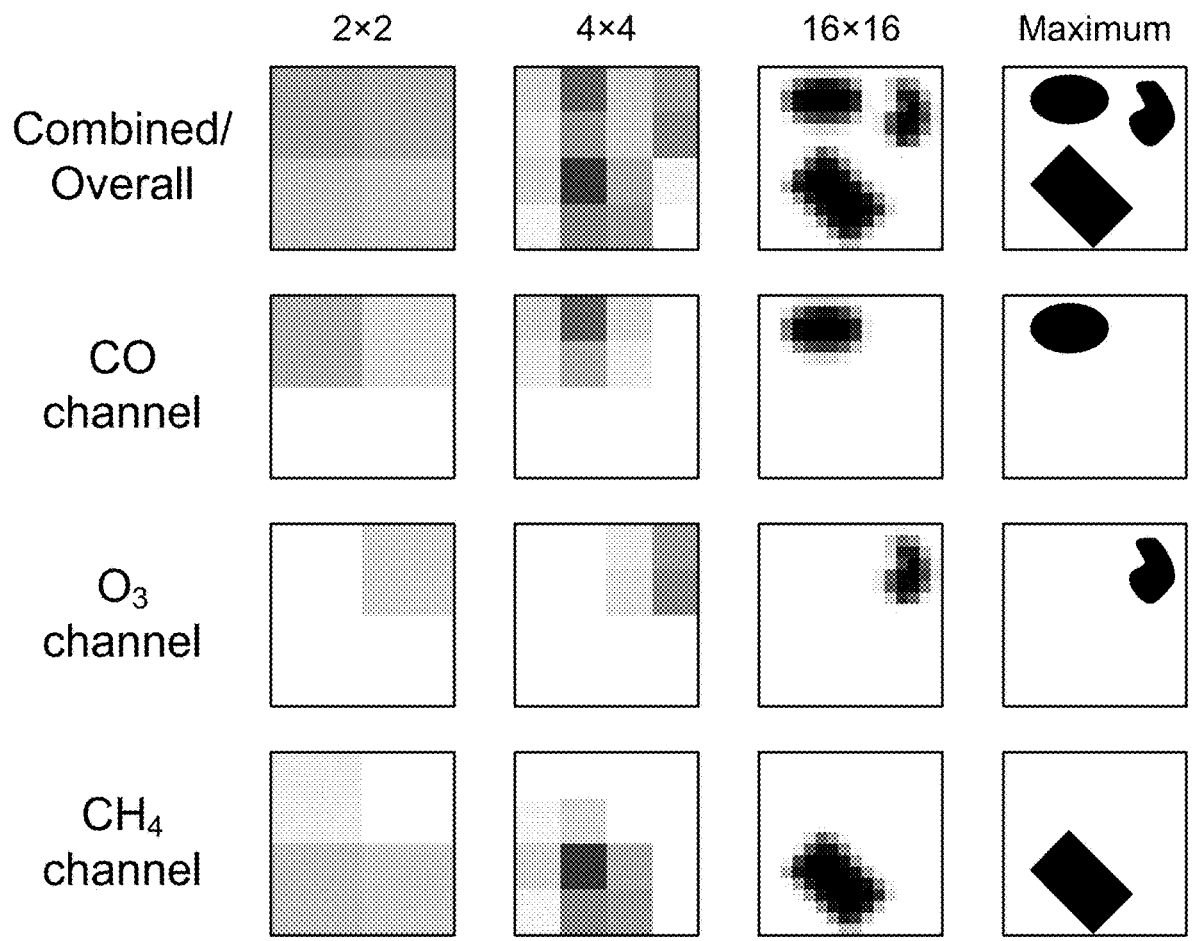
FIG. 6 provides an overview of example separation of a hyperspectral image into different frequency domain images as well as the effect of increasing the spatial resolution of the images.

FIG. 6 provides a schematic representation of different frequency component images of a hyperspectral image as well as the effect of increasing the spatial resolution of the images. In FIG. 6, the top row corresponds to the combined or overall absorption, the second row corresponds to absorption by CO, such as absorption at about 2120 $cm^{-1}$, the third row corresponds to absorption by $O_3$, such as absorption at about 1058 $cm^{-1}$, and the bottom row corresponds to absorption by $CH_4$, such as absorption at about 1305 $cm^{-1}$. The first column, labeled 2×2, corresponds to images spatially resolved into 4 pixels, as described above with reference to FIG. 5B. The second column, labeled 4×4, corresponds to images spatially resolved into 16 pixels, similar to the technique described with reference to FIG. 5B, but employing finer encoding patterns and additional images. The third column, labeled 16×16, similarly corresponds to images spatially resolved into 256 pixels. The last column, labeled Maximum, corresponds to the theoretical best resolved image obtainable. As the resolution of the image is increased, finer spatial details can be detected and clear distinctions between the locations of different materials in the target can be discerned. Again, it will be appreciated that the target used in FIGS. 5A, 5B, and 6 is merely exemplary and used to illustrate how different chemical species may be detected in a spatially resolved way using a combination of dual frequency comb Fourier transform spectroscopy and computational imaging. Other examples will be appreciated, including that the techniques described herein can not only spatially resolve different chemical species, but also spatially resolve relative amounts of different chemical species that may be present across a target, including in regions where the different chemical species spatially overlap.

It will further be appreciated that, although the example target 500 depicted in FIG. 5A shows spatially distinct regions of CO 505, $O_3$ 510, and $CH_4$ 515, since these gases exhibit distinct absorption features, in mixed gas configurations (such as where there may be full and/or partial overlap of regions 505, 510, and 515) the spatial distributions of the different gases are still separately identifiable. For example, in a target including overlapping regions of methane and carbon monoxide, the absorption and spatial distribution of gases are still individually determinable. Such characteristics advantageously allow for the spatial concentration distributions of different gases present in the same region of space to be individually determined. It will also be appreciated that absorption characteristics and spatial distribution of solids and liquids may be similarly detected.

Figure 7:
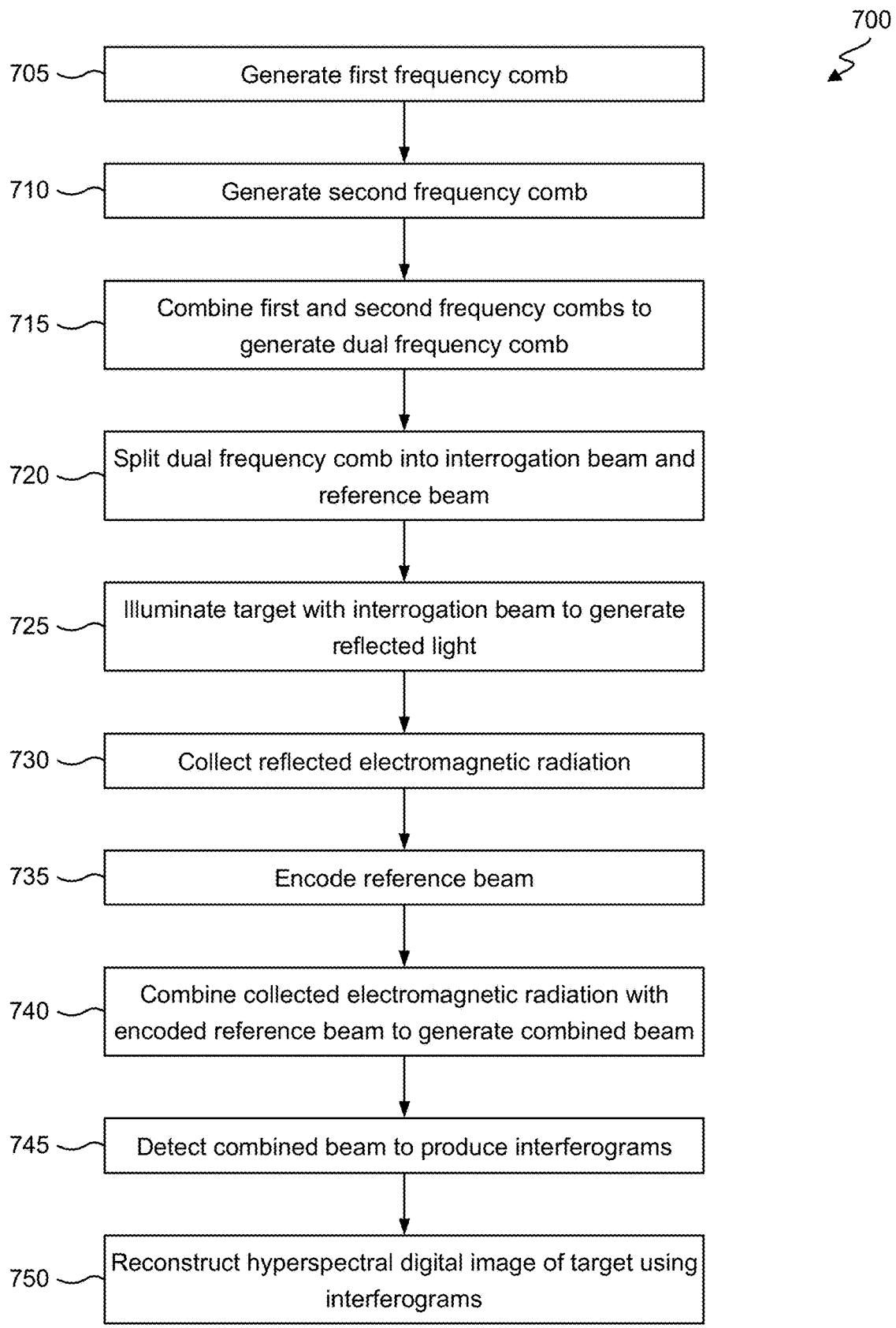
FIG. 7 provides an overview of an example method of generating a hyperspectral image.

FIG. 7 provides an overview of an example method 700 for generating hyperspectral images, in accordance with some embodiments. At block 705 a first frequency comb is generated and at block 710 a second frequency comb is generated. Each of the first and second frequency combs may be generated using a similar technique or frequency comb source or different comb sources may be used. In embodiments, the first and second frequency combs may exhibit or correspond to frequency combs over the same or approximately the same frequency range.

In embodiments, the first and second frequency combs will exhibit different repetition frequencies, such that the frequency combs are not identical but have a slight mismatch in frequencies such that their spectra are not identical. It will be appreciated that, in embodiments, frequency resolution may be set by the comb repetition rates (comparable to a scan distance difference of a mirror in a conventional Fourier transform spectrometer). Frequency resolution may be limited, in embodiments, by Nyquist sampling limits, with Nyquist sampling conditions and 1/f noise restricting the comb bandwidth ($\Delta v$ comb) in order to avoid aliasing. For example, in order to achieve a broad spectral bandwidth, a low value for the difference in comb repetition rates ($\Delta f$) may be used. However, going to ultra-small $\Delta f$, at the other end, may be limited by the individual combs' repetition rate stability. In some embodiments, an offset in repetition frequency between the first and second frequency combs may be on the order of $10^{-6}$ or $10^{-7}$. For example, in one embodiment, erbium-doped femtosecond lasers having a central wavelength of about 1560 nm are used for the generating the first and second frequency combs. The lasers may each have a repetition rate of about 100 MHz, with an example repetition frequency offset between the two lasers of about 3 kHz.

At block 715, the first and second frequency combs are combined, such as using a beam combiner, beam splitter, or other optical element, to generate a dual frequency comb. The dual frequency comb may be used as a source for Fourier transform spectroscopy, as described herein. It will be appreciated that the dual frequency comb may correspond to collinear pulsed laser beams. For use in obtaining spectral characteristics, embodiments are contemplated where the combination of the first and second frequency combs is performed prior to interaction with a sample or target, though other embodiments may allow interaction of the first frequency comb with a sample while the second frequency comb is maintained as a reference and does not interact with the sample.

As illustrated in FIG. 7, however, at block 720, the dual frequency comb is split into an interrogation beam and a reference beam. In this way, a first portion of the dual frequency comb can be maintained as a reference beam that does not interact with the target, while a second portion of the dual frequency comb can be used to interrogate the target.

At block 725, the target is illuminated with the interrogation beam. The interaction of the interrogation beam may generate scattered, emitted, or reflected electromagnetic radiation. In an embodiment where imaging of the target is desired, the illumination of the target may occur by way of a spatially dispersive optical element, which allows the interrogation beam to spread in space across the target. An example spatially dispersive optical element includes a telescope, which may comprise one or more lenses, mirrors, prisms, or other optical elements arranged to spatially distribute the interrogation beam.

Electromagnetic radiation from the target, such as reflected (inclusive of loss due to absorption from the target material), scattered, or emitted electromagnetic radiation is collected at block 730. In some embodiments a second telescope or other collection optic may be used to collect the electromagnetic radiation from the target. In some embodiments, the same element used for illuminating the target with the interrogation beam is used to collect the electromagnetic radiation from the target for subsequent detection. The collected electromagnetic radiation may be subsequently detected.

At block 735, the reference beam is encoded to generate an encoded reference beam, such as by using a spatial encoding device, like a digital micromirror device, a spatial light modulator, a liquid crystal on silicon device, a liquid crystal array, or a deformable mirror. Encoding the reference beam may allow the reference beam to possess spatial variations that can be exploited in one or more computational imaging techniques. In some embodiments, prior to encoding the reference beam, the reference beam may be expanded so that the reference beam can fill all or a portion of the encoding device, which may allow finer resolution details to be extracted using a computational imaging technique.

At block 740, the collected electromagnetic radiation from the target and the encoded reference beam are combined to generate a combined beam. For example, an optical combiner or a beam splitter may be used to combine the collected electromagnetic radiation from the target and the encoded reference beam.

At block 745, the combined beam is detected to produce a set of interferograms. For example, the electromagnetic radiation collected from the target may exhibit an interference effect, at least in part, with the encoded reference beam upon detection to produce a time dependent interferogram. The interferogram may correspond to a time-dependent intensity or power measurement of the combined beam, which includes characteristics of both the encoded reference beam and the electromagnetic radiation collected from the target.

At block 750, a hyperspectral digital image of the target is reconstructed using the interferograms. For example, the interferograms may undergo Fourier transformation to obtain the frequency spectrum of the electromagnetic radiation emitted from the target. To obtain spatial characteristics of the target, the interferograms and/or the frequency spectra may be subjected to a computational imaging method. For example, the encoding patterns used to encode the reference beam may be used in a computational imaging technique to reconstruct the spatial characteristics of the target. As an example, the interferograms and/or the frequency spectra may be weighted by a value representative of the encoding pattern. Through the use of multiple encoding patterns having different and known spatial characteristics, different weightings may be applied to corresponding detected interferograms and/or frequency spectra and spatial characteristics may be extracted. The resultant reconstructed spatial characteristics may include a plurality of spatial locations and corresponding spectral characteristics, such as absorbance measures of different spatial locations of the target, which may correspond to a hyperspectral image. It will be appreciated that the techniques applied for reconstructing the hyperspectral image may advantageously allow different materials to be identified in a target or scene, as described above.

The invention may be further understood by reference to the following non-limiting examples.

Example 1: Low Size Weight and Power Hyperspectral Imaging

Introduction. Governments and commercial industries have a need for a low SWAP (size weight and power) hand held hyperspectral imager for detection & identification of manmade objects, such as military targets in camouflage/foliage and chemicals gas emission. Hyperspectral imagers develop 3D data cubes (2D images tied to a 3rd axis for spectral content) which can be processed to identify materials of interest. In order to produce 3D hyper cubes with current systems, a 2D FPA is used where one axis of the array is used for imaging and the other axis is used to collect spectral output form a target of interest via some type of dispersive optical element. In order to produce a true 3D Cube, the sensor must be scanned in the 3rd axis to produce the 2D spatial image. The present application provides for generation of 3D hypercubes without a scanning system. It further provides for production of a 2D image and a spectral output with only one broad band detector, which enables significant reductions in size, weight and power consumption. Aspects of the embodiments described herein make use of a combination of two distinct technologies into an integrated sensor to afford these SWaP reductions. In one aspect, the embodiments provide advances in (1) dual optical frequency comb spectroscopy technology, and (2) computational imaging technology. It will be appreciated that dual optical frequency comb spectroscopy technology, and computational imaging technology have been demonstrated and document in the literature individually, but advances are needed to combine these techniques for the generation of hyperspectral images. The integration of these two distinct technologies into an integrated solution advantageously allows for 3D hypercubes to be generated by a hand held size sensor in order to detect and identify materials of interest. Additionally, this techniques and hyperspectral imaging systems allow for hyper temporal and range profiling techniques to provide improved mix gas detection. Details regarding the use of dual frequency comb spectroscopy with aspects described herein will now be given followed by an overview of various computational imaging techniques useful with the hyperspectral imaging systems and techniques described herein.

Dual Frequency Comb Spectroscopy, also referred to herein as Dual Optical Frequency Comb spectroscopy. Frequency combs have developed into numerous application domains. Frequency combs with both coherent and incoherent configurations are useful in active remote sensing. It will be appreciated that two-comb interferometry is a time domain representation, and may be referred to as, Dual Optical Frequency Comb Fourier Transform Spectrometry (DOFC-FTS). In DOFC-FTS, two frequency combs having slightly different repetition rates are combined by interferometric interaction. The combined combs are then detected, where the complex field contributions from the two combs (the electric fields defined as $E1(t)$ and $E2(t)$, respectively) are detected such that the photocurrent is proportional to the incident power. The response can be modeled as a square law device acting on the incident field. This photocurrent is then filtered by the electrical impulse response of the detector. The individual comb powers do not contain any interferometric information. The combined modulated components of the photocurrent (assuming that the pulses' periods are much shorter than the repetition period of the combs) of every individual comb interact only with the nearest pulse from the other comb. If the response time of the detector can be assumed to be much longer than the individual pulses (which is typically the case when ultra-short pulses are considered), then the detector's impulse response can be considered constant over the interaction length of the optical pulses and the measured photocurrent can thus be seen as a sum of photodetector impulse responses, which are amplitude modulated by the real part of the phase shifted complex cross-correlation of the comb pulses at regularly pulse periods. One of the fundamental assumptions in dual-comb interferometry is that the complex cross-correlation of the complex pulse shapes, A1 and A2 at a given delay time is the average repetition period of the combs optical delay between the two interacting pulses. This may only be true if every pulse from the two combs pulse trains are assumed to be identical to the other pulses from the pulse repetition train. Over short pulsing periods, this can be assumed to be true.

DOFC Applied to Remote Sensing. In remote sensing with DOFC, comb interferometry interaction with a target can be expressed as coherent or incoherent, depending on how the combs interact with the target.

Incoherent DOFC-FTS. In incoherent DOFC-FTS, the target is sampled after the combs have been combined. Assuming the target of interest is linear and time invariant, the resulting signal at the photodetector is the cross-correlation of the pulses resulting from both combs being modulated by the response from the target. Since the output spectrum of a modulated signal is simply the product of the spectrum of the input signal and the complex frequency response of the target, the output is more easily measured in the frequency domain. Every copy in the beating spectrum is the product of the unfiltered cross-spectrum of the comb pulses and the power spectrum caused by the filtering from the target. As is the case with all Fourier transform based spectroscopic techniques, dual-comb spectroscopy relies on a time invariant target over the sampling period. If the target changes while the interferogram is being formed, it is much more challenging to recover its spectral information. However, the incoherent configuration is insensitive to reasonably small delay fluctuations in the sample. In the time domain, this property can be understood by noting that the sample delay is experienced by both laser beams.

Coherent DOFC-FTS. In coherent DOFC-FTS, the target is placed before the combination of the combs, such that it interacts (i.e. filters) only one of the combs, referred to herein as an interrogation beam or interrogation comb, while another of the combs does not interact with the target and is referred to herein as a reference beam or reference comb. However, since only one of the combs is filtered by the target, every copy is multiplied by its complex transfer function instead of its power spectrum. It means that the full spectrum of the sample (in amplitude and in phase) can be obtained by isolating one copy and normalizing by the known comb cross-spectrum. In the coherent case, the amplitude of the electrical pulse resulting from the interference of the two comb pulses is proportional to the convolution of the cross-correlation of the comb pulses and the impulse response of the target. If the cross-spectrum of the combs has a much higher bandwidth than the sample (or equivalently, if the comb pulses are much shorter than the features of impulse response to be measured) the comb pulses can be modeled as Dirac delta functions. Contrary to the incoherent dual-comb case, the coherent version is sensitive to delay fluctuations in the sample. It will be appreciated that both incoherent DOFC-FTS and coherent DOFC-FTS may be employed in the hyperspectral imaging systems and methods described herein.

A variety of computational imaging techniques may be employed. It will be appreciated that since the invention of the CCD detector, image processing has moved away from physical implementations in optics and toward image processing in electronics and software. The CCD detector made it possible to detect imagery and transform it immediately into a format to which one could apply digital electronic processing. Today this has evolved into computational imaging. Computational imaging has several broad categories with compressed imaging being perhaps the best known example of computational imaging. In compressed imaging, a scene is encoded optically prior to detection in such a way that it produces a compressed representation upon detection. In embodiments, computational imaging is employed to allow spatial characteristics of an imaged target to be reconstructed using digital image processing techniques and algorithms.

Coded Aperture Imaging. A subset of computational imaging is coded aperture imaging, which enables retrieval of the spatial information of an object scene with the use of a single-pixel detector. By illuminating with a series of known random patterns and measuring the backscattered intensity, it is possible to reconstruct a two-dimensional (2D) image. Algorithmic reconstruction is used to render the image. It will be appreciated that the techniques described above with respect to FIGS. 5A-6 may fall under the umbrella of coded aperture imaging reconstruction.

Computational Ghost Imaging. Another subset of computational imaging that is useful with the systems and techniques described herein is computational ghost imaging (CGI). In basic ghost imaging (GI), the optical properties of a two-dimensional object, such as transmittance, reflectance, and scattering are generated using a single pixel bucket detector. It will be appreciated that ghost imaging is a useful alternative to conventional camera-based imaging. For example, application of a speckle interference pattern as a reference field can be performed for image reconstruction, such as by using thermal light as the source. It will further be appreciated that the correlation procedure may involve the ensemble averaging of many images.

Hadamard transform imaging. A sub-variant of code aperture computational imaging is Hadamard transform imaging (HTI). In HTI, the intensities of light passing through a series of spatially coded masks, i.e., Hadamard masks, and an object are measured sequentially as time series data. The object image is then reconstructed by performing an Inverse Hadamard transform. HTI gives inherently the same information as an orthogonal transform imaging technique, which may be useful in the field of compressive sensing (CS). Although CS may employ a single-channel detector and has similarities to CGI and HTI, its applicable conditions for reconstructing the image of an object are different: CS takes advantage of the sparsity of information on the target, which when illuminating with DOFC will be the case. However, both CGI and HTI are similar in terms of their applicable conditions and performance.

Coherent imaging by phase retrieval with illumination pattern constraints. Coherent imaging by phase retrieval with structured illumination patterns may correspond to an active imaging technique that forms images by flood-illumination with a coherent laser beam. The reflected optical field at the object propagates to produce a speckle pattern in a plane at a distance from the object. Measuring this coherent field by homodyne detection allows for reconstructing the image by digitally post processing the measured field so as to propagate the field back to the object plane using a Fresnel or Fourier transform. From the intensity measurements reconstruction of the image can be achieved using imaging correlography techniques. It will be appreciated that collecting a large number of independent realizations of the speckle pattern intensity permits computing the auto-covariance (the ensemble averaged autocorrelation, after subtracting the mean) of the speckle patterns, which equals the squared magnitude of the Fourier transform of the incoherent object (the object intensity reflectivity had it been incoherently illuminated). A phase retrieval algorithm using a non-negativity constraint and a support constraint, based on the illumination pattern, can re-construct the image. Phase retrieval algorithms for real-valued, non-negative images may be achieved. It will also be appreciated that, with illumination of an object with a series of laser wavelengths or optical frequencies, a "cube" of data can be assembled. As such, the series of multiple wavelengths forms a set of independent realization of the object speckle return. This approach may enable lens-less imaging by illumination of an object, target, or scene with a laser beam having a known, favorable shape. The shape is used such that it becomes a support constraint for a phase retrieval algorithm to reconstruct an image. Effectively, this technique permits reconstructing a coherent image from a farfield speckle intensity pattern using known illumination patterns.

Homodyne imaging of transverse electromagnetic field (resulting in amplitude & phase). It will be appreciated that conventional imaging methods may respond to illumination via square-law detection. In Coherent imaging, sources such as a laser illuminate a target to be imaged. The scattered image field, $\emptyset_{Image}$, is collected resulting with an intensity I, which is proportional to $|\emptyset_{Image}|^2$ with all phase information lost. Fourier Transform Homodyne (FTH) imaging expands on conventional coherent detection and incorporates transverse spatial encoding (and by expansion spectral encoding) of the local oscillator (i.e. the reference comb in DOFC applications). This enables remote field retrieval of the target image. FTH detection can circumvent the square-law limitations, and hence; is capable of directly imaging the transverse amplitude & phase of coherent electromagnetic fields.

In FTH Field Imaging, the image field, $\emptyset_{Image}$, is re-combined with a local oscillator (L.O.) which is beam split off of the source combs, whose transverse amplitude and phase are sequentially modulated with a known set of reference spatial phase functions, $\emptyset_{Ref}=\emptyset_{m,n}$, to form a valid basis set. FTH field imaging is effectively a Fourier projection concept based on square-law heterodyne detection relating the spatial distribution of an image field, ($\emptyset_{Image}$), to that of a (user defined) reference field. The heterodyning of the image field with the reference field, in a square-law detector results in a complex intermediate frequency current. The magnitude ($\beta$) and phase ($\alpha$) of the intermediate frequency current conveys the spatial Fourier projection of the reference field onto the image field. The magnitude and phase of the intermediate frequency detector current, when measured, forms a complex Fourier coefficient, $C_{l,m,n}$, for each spatial function, $\emptyset_{m,n}$. It will be appreciated that this can be expanded in to a set of spectral functions as well, by expansion of Fourier coefficient 1, from the center frequency. This process can be viewed as a Fourier projection operator with the intermediate frequency current conveying the magnitude and phase of the projection at multiple wavelengths. A reconstruction of the image field can be formed from the basis functions, $\emptyset_{m,n}$, and the measured Fourier coefficients, $C_{l,m,n}$. It will also be appreciated that the detecting surface, s, can be either a single element or partitioned into multiple elements and coherently summed.

Combination of DOFC-FTS and Computational Imaging. Combination of dual optical frequency comb spectroscopy and computational imaging enable the integration of these two technologies into a low SWaP format. While these two technologies are independently useful, the integration of these two technologies into an integrated solution provides a number of important advantages that each alone does not provide, including spatial detection of hyperspectral information using a single element detector and/or without any moving parts or mechanisms, for example. Additional details of integration of the two technologies enabling hyperspectral imaging follows.

DOFC-FT Computational Imaging Spectrometer. FIG. 2 provides a schematic block diagram, described below with respect to a DOFC-FT Computational Imaging Spectrometer of a particular embodiment.

Transmitter side. Two micro resonator type frequency combs operating in the mid IR region may be employed as frequency comb sources 205 and 215. The IR spectral region (2-20 μm) is of interest because molecules undergo strong fundamental vibrational transitions in this region. The mid-infrared region also contains two important windows (3-5 μm and 8-13 μm) in which the atmosphere is relatively transparent. These regions can be used to detect small traces of environmental and toxic vapors. The regular pulse train of a mode-locked femtosecond laser can give rise to a regular comb spectrum of millions of laser modes with spacing equal to the pulse repetition frequency. It will be appreciated that parametric oscillation is useful for frequency comb generation in optical micro-resonators. These dielectric resonators may include an essentially toroidal ring of sub-millimetric diameter, which hosts very high quality optical whispering-gallery modes (WGMs). When pumped with a strong pump field, the material's third-order non-linearity can lead to four-wave mixing (FWM), for example. For a single-frequency continuous-wave pump, this implies, remarkably, that a single-frequency pump laser can give rise to not only one signal-idler-pair, but a massive cascade of signal and idler sidebands, which additionally become mutually phase-locked by non-degenerate. Using a strong NIR laser resonators made from crystalline materials, such as calcium and/or magnesium fluoride, support ultra-high-Q WGM still deep in the mid-IR.

It will be appreciated that the theoretical formulism for the Fourier Transform of a DOFC-FTS in an incoherent mode is useful. In two-comb interferometry, two frequency combs having slightly detuned repetition rates are combined, using an optical coupler such as a beam splitter. The combined combs are then photo-detected. The detector generates a photo-current (see below) that is proportional to the incident power, and it can be modeled as a square law device acting on the incident field. This photocurrent is then filtered by the electrical impulse response of the detector system. The measured photocurrent is then the response to the combined fields from both combs.

The two combs are combined by use of a fold mirror and a 50/50 beam splitter 230. This combination enables the combs to operate in an incoherent DOFC-FTS mode, since the target would be sampled after the combs have been combined. After combination at beam splitter 230, the combined combs are folded at a second mirror. This allows the combined beams to couple to beam splitter 240. Beam splitter 240 will split the combined beams in a 50/50 ratio to into the integration beam 250 and the reference beam 240. This allows the reference beam 240 to propagate to the encoder 255, which may be a deformable mirror, that acts a spatial light modulator for encoding the reference beam.

The interrogation beam propagates to another mirror where it is folded to allow the interrogation bean to couple via beam splitter 280 to the output telescope 265, 270 which may be an all reflective telescope to preserve the transmitted beam and the target's spectral content. Beam splitter 280 also couples the receiver to the output telescope.

Transmitted Beam. The DOFC coherent laser beams (interrogation beam 250) then propagate to flood-illuminated a target at short to moderate ranges. The reflected optical field from the target propagates to produce a speckle pattern in a plane at the receiver. Measuring the coherent field, corresponding to the re-combination of the interrogation DOFC beam and the reference DOFC beam, in that plane, by homodyne or heterodyne detection process, permits reconstructing the target complex image by propagating the field back to the object plane using a Fresnel or Fourier transform. However, homodyne or heterodyne detection over a large array of detectors, needed to form an image of a complicated object, is SWaP and cost prohibitive for portable hand-held applications and so other detection techniques are useful. The response at the detector can be expressed from the photocurrent as a sum of the power from each individual comb and an interference term between both combs. Assuming that the pulses are much shorter than the repetition period of the combs, each pulse from every comb interacts only with the nearest pulse from the other comb. The complex cross-correlation of interaction can thus be seen as a sum of detector impulse responses, which are amplitude modulated by the real part of the phase shifted complex cross-correlation of the comb pulses at regularly increasing delays. Formation of the spectral content from the Fourier transform of this image is described below.

Receiver side. After interaction with the target the combined beams propagate and are collected by the all reflective telescope 265, 270 as shown in FIG. 2. The return combined beam's projected speckle pattern then proceeds thru beam splitter 280 and onto beam splitter 285 where the interrogation beam 250 return is coupled to the reference beam 245, which has been spatially modulated to encode it. The two electromagnetic fields (the reference and interrogation return) combine to enable a beat intermediate frequency (IF) to be created. This IF is down shifted into the radio frequency (RF) region where typical photo-detectors can respond to the impulse of the IF input. Assuming the target is linear and time invariant, the resulting signal at the detector is the cross-correlation of the pulses resulting from both combs being filtered by the impulse response of the target, both spatially and spectrally. Since the output spectrum of interaction signal is the product of the spectrum of the input signal and the complex frequency response of the filtering system (the target), this is effectively the complex optical frequency response of the target. Every copy in the beating spectrum is thus the product of the unfiltered cross-spectrum of the comb pulses and the power spectrum of the filtering target. In this way, the full target's transfer function is possible to obtain. Since its phase is cancelled by the fact that the target filters both of the DOFC pulses. In optical spectroscopy, the sample is often assumed to have a minimal phase response, thus satisfying the Kramers-Kronig relation.

In the absences of any particular encoding added into the reference beam 245 as it splits off of beam splitter 240 and interacts with the encoder 255, the two beam interact to produce the interferogram from which the spectral content of the target can be generated by an inverse Fourier transform.

However, this response is the combined spectral target signature without any spatial content, effectively a totally mixed hyperspectral signature. To generate the spectral signature of the target area correlated to a spatial dimension, the reference beam 245 is modulated, as is done in coded aperture imaging or computational ghost imaging, for example, via homodyne sequential image collection.

Field Imaging via Fourier Transform Heterodyning. It will be appreciated that when the image field is homodyned with a discrete set of reference fields ($\Phi_{Ref}(x,y) \rightarrow \Phi_{m,n}$) created by spatial manipulation of the reference beam via the spatial encoder 255 as shown in FIG. 2, then the image Fourier expansion pair becomes:

$$\Phi_{Image}(x,y,\Delta\omega_l) = \Phi_{Image}(x,y,l) = \Sigma\Sigma C_{l,m,n} \Phi_{m,n}(x,y),$$

where the index l represents the lth intermediate frequency bandpass frequency.

By sequentially stepping thru a series of coded aperture type patterns in the reference field and then homodyning the image field, $\Phi_{Image}$, with the local oscillator (L.O.), whose transverse amplitude and phase is sequentially modulated with a known set of reference spatial phase functions, $\Phi_{Ref} = \Phi_{m,n}$, the measure of the detector current's magnitude and phase form the complex Fourier coefficient, $C_{m,n}$, for each spatial function, $\Phi_{m,n}$. The image field can be reconstructed from the basis functions, $\Phi_{m,n}$, and the measured $C_{m,n}$.

Hyperspectral field imaging via a DOFC Fourier transforms homodyne approach. It will be appreciated that the extension to a multiple set of wavelengths produced by the DOFC is a more complex problem, but solvable in the same way. The resultant image transformation produces the spectral signature of a particular (partial) spatial section of the target scene. Using sequential manipulation of the encoder to produce a set of structured and random patterns, the full image can be spatially correlated. However, given that the scene may be sparse, then compressive sensing techniques can simultaneously be applied to speed up the collection process.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An imaging device, comprising:
   a first frequency comb source for generating a first frequency comb at a first repetition rate;
   a second frequency comb source for generating a second frequency comb at a second repetition rate that is offset from the first repetition rate;
   a first beam combiner in optical communication with the first frequency comb source and the second frequency comb source, the first beam combiner for combining the first frequency comb and the second frequency comb to generate a dual frequency comb;
   a first beam splitter in optical communication with the first beam combiner, the first beam splitter for splitting the dual frequency comb to generate an interrogation beam and a reference beam;
   a spatial encoder in optical communication with the first beam splitter, the spatial encoder for spatially encoding the reference beam using a set of reference fields to generate an encoded reference beam;
   a reflective telescope in optical communication with the first beam splitter, the reflective telescope for illuminating a target with the interrogation beam;
   a collection optic positioned to collect reflected light generated by interaction of the interrogation beam with the target;
   a second beam combiner in optical communication with the spatial encoder and the collection optic, the second beam combiner for combining the reflected light with the encoded reference beam to generate a combined beam; and
   a detector in optical communication with the second beam combiner, the detector for detecting the combined beam and producing a set of interferograms.

2. The imaging device of claim 1, further comprising:
   a processor configured to generate a hyperspectral digital image of the target using the set of interferograms and the set of reference fields.

3. The imaging device of claim 2, wherein generating the hyperspectral digital image of the target includes computing inverse Fourier transforms of the set of interferograms, with each interferogram spatially weighted by a corresponding reference field.

4. The imaging device of claim 2, wherein generating the hyperspectral digital image of the target includes performing a coded aperture imaging reconstruction algorithm using the set of interferograms and the set of reference fields, a computational ghost imaging reconstruction algorithm using the set of interferograms and the set of reference fields, a Hadamard transform imaging reconstruction algorithm using the set of interferograms and the set of reference fields, a coherent imaging by phase retrieval with structured illumination imaging reconstruction algorithm using the set of interferograms and the set of reference fields, or a Fourier Transform homodyne imaging reconstruction algorithm using the set of interferograms and the set of reference fields.

5. The imaging device of claim 2, wherein the hyperspectral digital image corresponds to a 3-dimensional representation of the target including a first spatial dimension, a second spatial dimension, and a third dimension corresponding to a frequency domain absorption spectrum.

6. The imaging device of claim 1, wherein the first frequency comb source, the second frequency comb source, or both, comprise a near infrared (NIR) femtosecond laser source, a crystalline micro-resonator, a silicon optical micro-resonator, an erbium-doped fiber laser, a photonic crystal fiber, or any combination of these.

7. The imaging device of claim 1, wherein the first repetition rate and the second repetition rate are offset by a factor between 10-5 and 10-7.

8. The imaging device of claim 1, wherein the spatial encoder comprises a digital micromirror device, a spatial light modulator, a liquid crystal on silicon device, a liquid crystal array, a deformable mirror, or any combination of these.

9. The imaging device of claim 1, wherein the spatial encoder modifies a spatial intensity distribution of the reference beam.

10. The imaging device of claim 1, wherein the detector comprises a single pixel.

11. The imaging device of claim 1, wherein the detector comprises multiple pixels with outputs from each of the multiple pixels summed to provide an overall output.

12. The imaging device of claim 1, wherein the detector comprises one or more of a broadband infrared detector, a short-wavelength infrared detector, a mid-wavelength infrared detector, and a long-wavelength infrared detector.

13. The imaging device of claim 1, wherein the detector comprises a thermoelectrically cooled detector.

14. The imaging device of claim 1, wherein the first beam combiner, the second beam combiner, or both comprise beam splitters.

15. The imaging device of claim 1, wherein the collection optic comprises the reflective telescope.

16. The imaging device of claim 1, further comprising one or more lenses, mirrors, beam splitters, filters, prisms, polarizers, waveguides, or any combination thereof positioned in optical communication with one or more of the first frequency comb source, the second frequency comb source, the first beam combiner, the first beam splitter, the spatial encoder, the reflective telescope, the collection optic, the second beam combiner, and the detector.

17. A method for generating a hyperspectral image, the method comprising:
    generating a first frequency comb at a first repetition rate, wherein the first frequency comb is generated by a first frequency comb source;
    generating a second frequency comb at a second repetition rate that is offset from the first repetition rate, wherein the second frequency comb is generated by a second frequency comb source;
    combining the first frequency comb and the second frequency comb to generate a dual frequency comb, wherein generating the dual frequency comb includes combining the first frequency comb and the second frequency comb using a first beam combiner;
    splitting the dual frequency comb to generate an interrogation beam and a reference beam, wherein generating the interrogation beam and the reference beam includes using a first beam splitter to split the dual frequency comb;
    spatially encoding the reference beam using a set of reference fields to generate an encoded reference beam, wherein spatially encoding the reference beam includes using a spatial encoder;
    illuminating a target with the interrogation beam, wherein the interrogation beam interacts with the target to generate reflected light, wherein illuminating the target includes using a reflective telescope;
    collecting the reflected light, wherein collecting the reflected light includes using a collection optic;
    combining the reflected light with the encoded reference beam to generate a combined beam, wherein combining the reflected light with the encoded reference beam includes using a second beam combiner;
    detecting the combined beam to produce a set of interferograms, wherein detecting the combined beam includes using a detector; and
    reconstructing a hyperspectral digital image of the target using the set of interferograms and the set of reference fields.

18. The method of claim 17, wherein reconstructing the hyperspectral digital image of the target includes:
    determining inverse Fourier transforms of the set of interferograms, with each interferogram spatially weighted by a corresponding reference field.

19. The method of claim 17, wherein reconstructing the hyperspectral digital image of the target includes performing a coded aperture imaging reconstruction algorithm, a computational ghost imaging reconstruction algorithm, a Hadamard transform imaging reconstruction algorithm, a coherent imaging by phase retrieval with structured illumination imaging reconstruction algorithm, or a Fourier Transform homodyne imaging reconstruction algorithm.

20. The method of claim 17, wherein the hyperspectral digital image corresponds to a 3-dimensional representation of the target including a first spatial dimension, a second spatial dimension, and a third dimension corresponding to a frequency domain absorption spectrum.

21. The method of claim 17, performed using an imaging device comprising:
    the first frequency comb source for generating the first frequency comb at the first repetition rate;
    the second frequency comb source for generating the second frequency comb at the second repetition rate that is offset from the first repetition rate;
    the first beam combiner in optical communication with the first frequency comb source and the second frequency comb source, the first beam combiner for combining the first frequency comb and the second frequency comb to generate the dual frequency comb;
    the first beam splitter in optical communication with the first beam combiner, the first beam splitter for splitting the dual frequency comb to generate the interrogation beam and a reference beam;
    the spatial encoder in optical communication with the first beam splitter, the spatial encoder for spatially encoding the reference beam using the set of reference fields to generate the encoded reference beam;
    the reflective telescope in optical communication with the first beam splitter, the reflective telescope for illuminating the target with the interrogation beam;
    the collection optic positioned to collect reflected light generated by interaction of the interrogation beam with the target;
    the second beam combiner in optical communication with the spatial encoder and the collection optic, the second beam combiner for combining the reflected light with the encoded reference beam to generate the combined beam; and the detector in optical communication with the second beam combiner, the detector for detecting the combined beam and producing the set of interferograms.

* * * * *